US011128735B2

(12) United States Patent
Gallegos et al.

(10) Patent No.: US 11,128,735 B2
(45) Date of Patent: Sep. 21, 2021

(54) REMOTE COMPUTING RESOURCE ALLOCATION

(71) Applicant: Microsoft Technology Licensing, LLC, Redmond, WA (US)

(72) Inventors: Dustin M. Gallegos, Miami, FL (US); Pavan Kumar V. Padavala, Bothell, WA (US); Praveen Kumar Kashimsetty, Redmond, WA (US); Praveen Ganapathi Subramanian, Bothell, WA (US); Shiladitya Srivastava, Bellevue, WA (US); Shri Humrudha Jagathisun, Redmond, WA (US); Varun R. Karandikar, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 102 days.

(21) Appl. No.: 16/153,552

(22) Filed: Oct. 5, 2018

(65) Prior Publication Data

US 2020/0112623 A1    Apr. 9, 2020

(51) Int. Cl.
*G06F 17/00* (2019.01)
*H04L 29/08* (2006.01)
*G06F 16/28* (2019.01)
*G06F 40/232* (2020.01)
*G06F 3/0488* (2013.01)
*G06T 11/20* (2006.01)

(52) U.S. Cl.
CPC ........ *H04L 67/327* (2013.01); *G06F 3/04883* (2013.01); *G06F 16/288* (2019.01); *G06F 40/232* (2020.01); *G06T 11/20* (2013.01)

(58) Field of Classification Search
CPC ................. G06F 16/288; G06F 40/232; G06F 3/04883; G06F 16/907; G06F 16/951; G06F 16/9535; G06F 16/5838; G06F 16/5854; G06F 16/7837; G06T 11/20; H04L 63/10; H04L 63/18; H04L 67/327
USPC ........................................................ 715/863
See application file for complete search history.

(56) References Cited

U.S. PATENT DOCUMENTS

| | | | | |
|---|---|---|---|---|
| 2004/0205672 | A1* | 10/2004 | Bates | G06F 40/242 715/256 |
| 2005/0289168 | A1* | 12/2005 | Green | G06F 16/951 |
| 2006/0277032 | A1* | 12/2006 | Hernandez-Abrego | G10L 15/193 704/9 |
| 2007/0294086 | A1* | 12/2007 | Suzuki | 704/254 |
| 2010/0127991 | A1* | 5/2010 | Yee | G06F 3/0412 345/173 |

(Continued)

OTHER PUBLICATIONS

"AWS to Azure services comparison", Retrieved Date: https://docs.microsoft.com/en-us/azure/architecture/aws-professional/services, Nov. 29, 2017, 20 Pages.

"Azure and AWS Cloud Service Map", Retrieved from: https://www.comparex-group.com/web/microsites/microsoft/news/news/Cloud_Service_Map_for_AWS_and_Azure_Available_Now.htm, Oct. 16, 2017, 37 Pages.

(Continued)

*Primary Examiner* — Jason T Edwards
(74) *Attorney, Agent, or Firm* — Rainier Patents, P.S.

(57) ABSTRACT

The discussion relates to allocating remote computing resources responsive to a user-driven free-form input. One example can receive free-form input from a user relating to remote computing resources. The example can map the free-form input to individual remote computing resources and can allocate the mapped individual remote computing resources for the user.

20 Claims, 13 Drawing Sheets

(56) References Cited

U.S. PATENT DOCUMENTS

| | | | |
|---|---|---|---|
| 2011/0307505 A1* | 12/2011 | Ito | G06F 16/7837 |
| | | | 707/769 |
| 2014/0104279 A1* | 4/2014 | Albrecht | G01C 21/34 |
| | | | 345/440 |
| 2014/0250143 A1 | 9/2014 | Dai et al. | |
| 2014/0280946 A1* | 9/2014 | Mukherjee | H04L 41/084 |
| | | | 709/226 |
| 2015/0169285 A1* | 6/2015 | Reyes | G06F 3/167 |
| | | | 715/728 |
| 2015/0271218 A1 | 9/2015 | Steingrimsson | |
| 2016/0371348 A1 | 12/2016 | Park et al. | |
| 2017/0006032 A1* | 1/2017 | Simpson | H04W 4/21 |
| 2017/0177710 A1* | 6/2017 | Burlik | G01C 21/3667 |
| 2017/0201551 A1 | 7/2017 | Tripepi | |
| 2017/0212612 A1 | 7/2017 | Zhou | |
| 2017/0277665 A1* | 9/2017 | Hansmann | G06F 16/986 |
| 2017/0285932 A1 | 10/2017 | Hastings et al. | |
| 2018/0069989 A1 | 3/2018 | Martinsen | |
| 2018/0174434 A1 | 6/2018 | Dyer et al. | |
| 2018/0332118 A1* | 11/2018 | Phipps | H04L 67/1095 |

OTHER PUBLICATIONS

Jin, et al., "An Information Framework for Creating a Smart City Through Internet of Things", In Journal of the IEEE on Internet of Things, Apr. 2014, pp. 112-121.

Santana, et al., "Software Platforms for Smart Cities: Concepts, Requirements, Challenges, and a Unified Reference Architecture", In Proceedings of the ACM Computing Surveys, Dec. 11, 2017, 35 Pages.

"Natural Language Processing", Retrieved From: https://web.archive.org/web/20180901014059/https://en.wikipedia.org/wiki/Natural_language_processing, Sep. 1, 2018, 8 Pages.

Glass, et al., "Discovering Implicit Knowledge with Unary Relations", In proceedings of the 56th Annual Meeting of the Association for Computational Linguistics (vol. 1: Long Papers), Jul. 15, 2018, pp. 1585-1594.

Lasecki, et al., "Apparition: Crowdsourced User Interfaces that Come to Life as You Sketch Them", In Proceedings of the 33rd Annual ACM Conference on Human Factors in Computing Systems, Apr. 18, 2015, pp. 1925-1934.

"International Search Report and Written Opinion Issued in PCT Application No. PCT/US19/54648", dated Jan. 2, 2020, 15 Pages.

* cited by examiner ial entities 60
REMOTE COMPUTING RESOURCE ALLOCATION

BACKGROUND

Traditionally, computers were kept onsite to provide whatever computing resources might be needed. Managing these computers, such as maintaining the hardware and software, replacing aging computers, ensuring sufficient capacity, etc. was complex and time consuming. A new paradigm has emerged where entities offer remote computing services to users. This new paradigm is appealing to many users who want to be freed from managing their own computers. However, user adoption has been slowed because potential users are unsure how to obtain the remote computing resources they desire.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

Traditionally, computers were kept onsite to provide whatever computing resources might be needed. Managing these computers, such as maintaining the hardware and software, replacing aging computers, etc. was complex and time consuming. This model is being challenged by a remote model (e.g., cloud model) where users pay an entity for specific computing resources and the entity handles all of the management of the computing devices. While attractive in many regards, the cloud model tends to be daunting to many potential users who do not understand the lingo of cloud computing. Further complicating matters individual entities tend to develop their own unique terminology and procedures that cause additional confusion. The present concepts can allow a user to request computing resources in a natural free-form manner that is comfortable for the user. The concepts can interpret the user's request to automatically obtain the computing resources from one or more entities for the user. Allowing the user to operate in their comfort zone lowers the barrier to entry that keeps many users from taking advantage of the benefits offered by remote (e.g., cloud-based) computing resources.

FIGS. 1A-1F collectively show an example scenario 100 where a user experience can be enhanced by allowing the user to request computing resources in a manner in which they are comfortable.

Figure 1A:
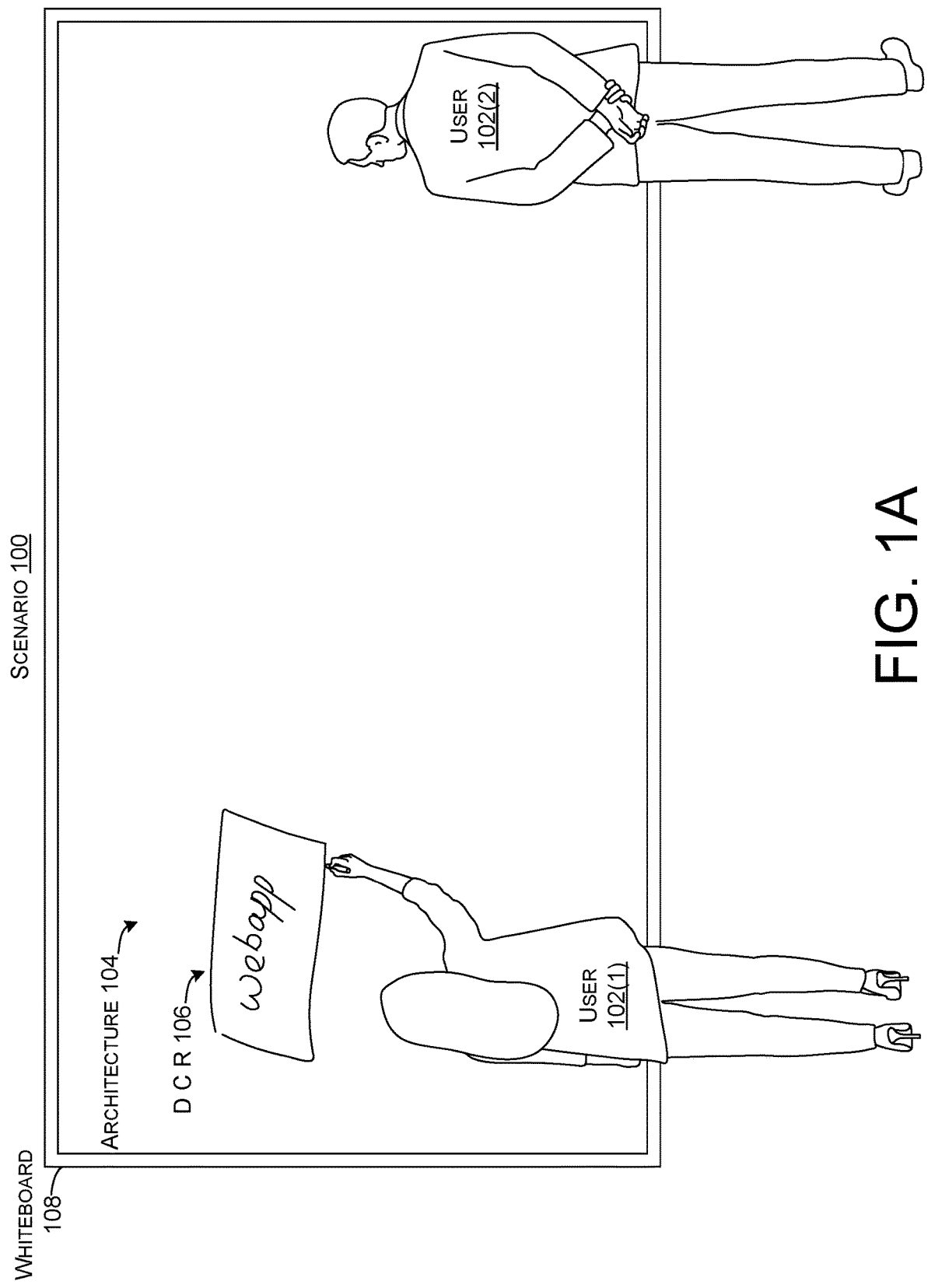
FIGS. 1A-1F and 2A-2D show example free-form remote computing resource allocation scenarios in accordance with some implementations of the present concepts.

FIG. 1A shows users 102 brainstorming about an architecture 104 of desired computing resources indicated generally at 106. In this case, the users are hand sketching the architecture 104 on a whiteboard 108.

Figure 1B:
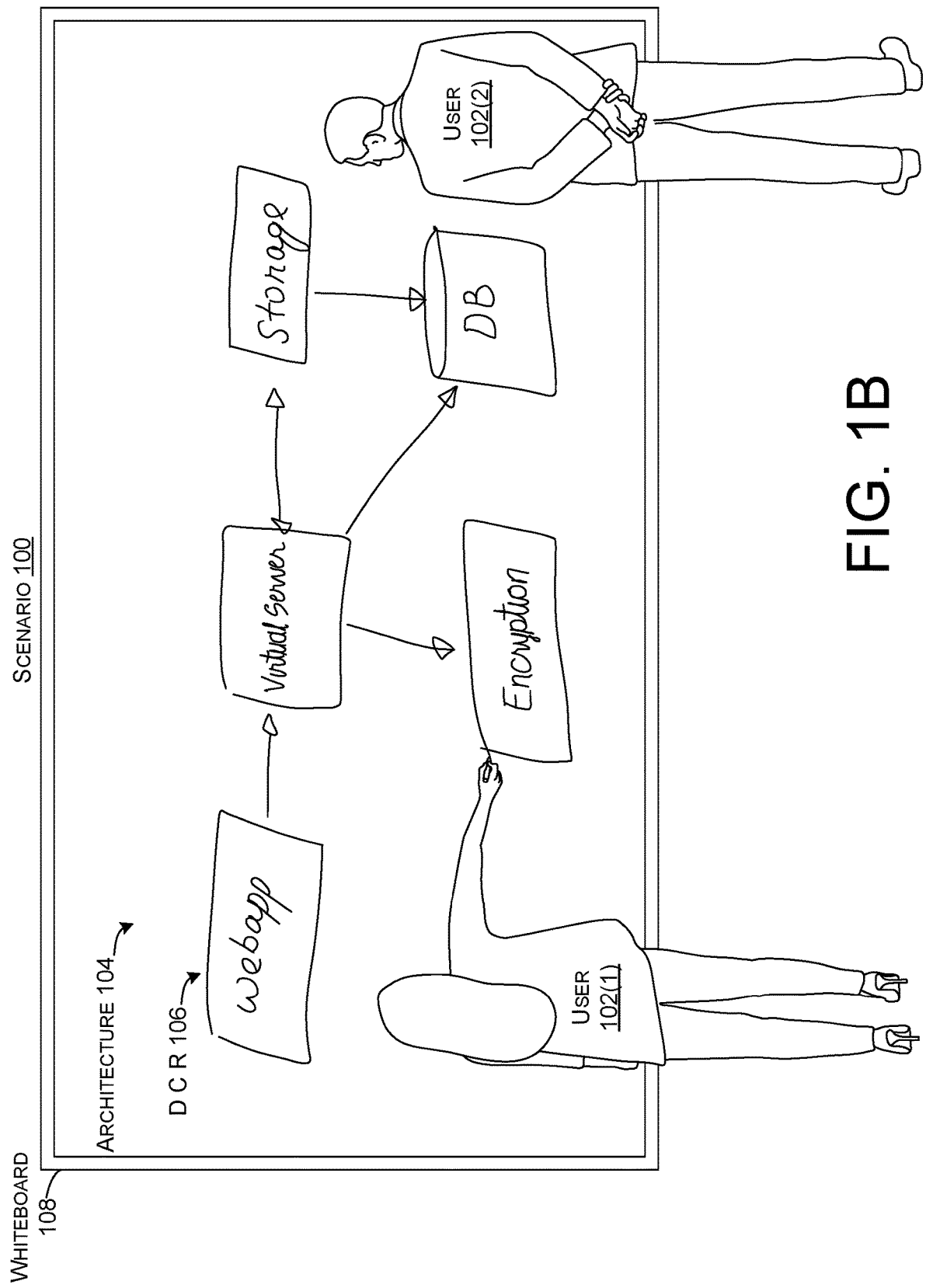

FIG. 1B shows the finished architecture 104 of the desired computing resources 106 on the whiteboard 108. In this example, the desired computing resources include a webapp, a virtual server, storage, a DB, and encryption.

Figure 1C:
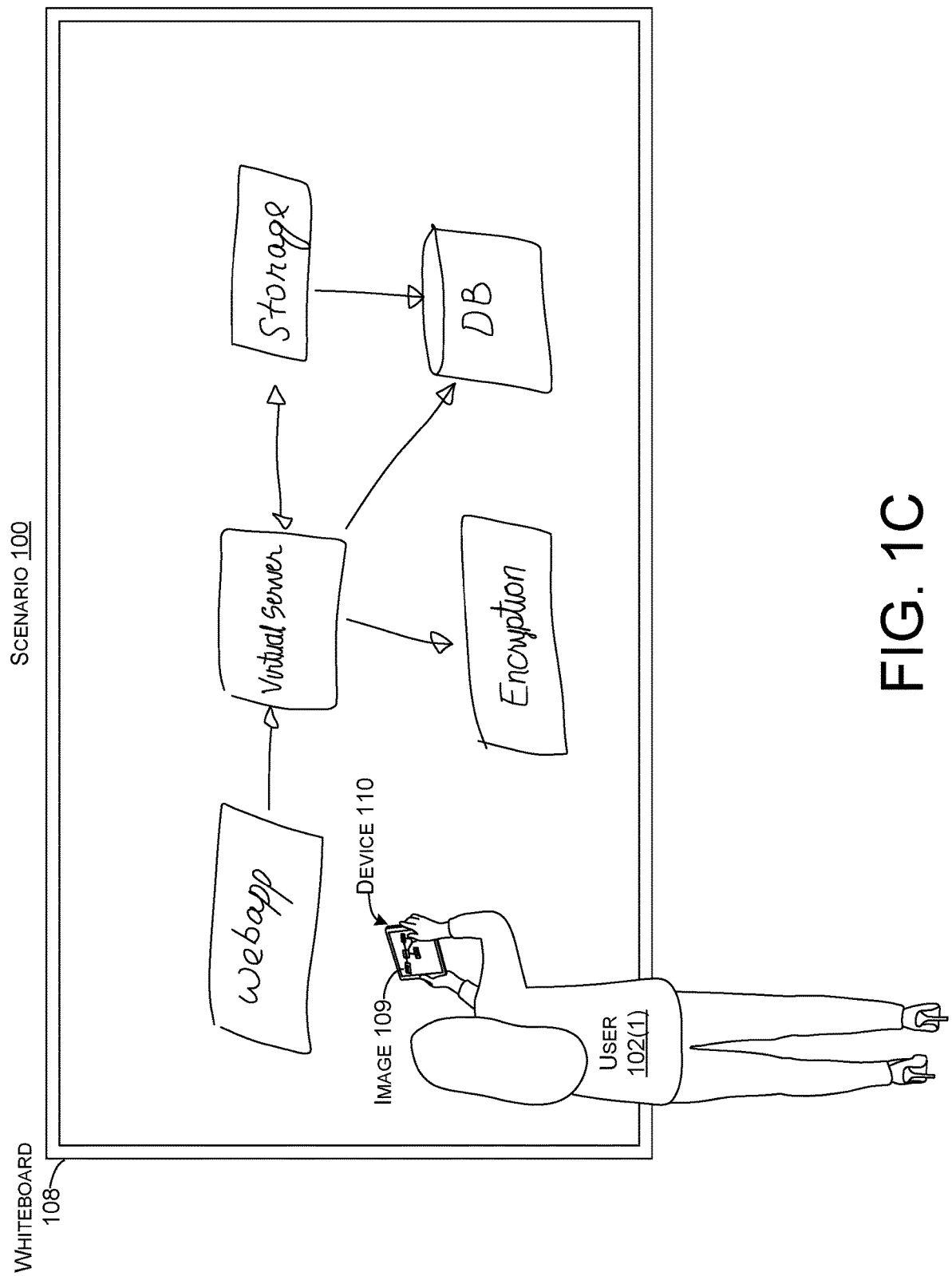

FIG. 1C shows the user capturing the desired computing resources as an image 109 with a camera on a computing device (e.g., tablet) 110.

Figure 1D:
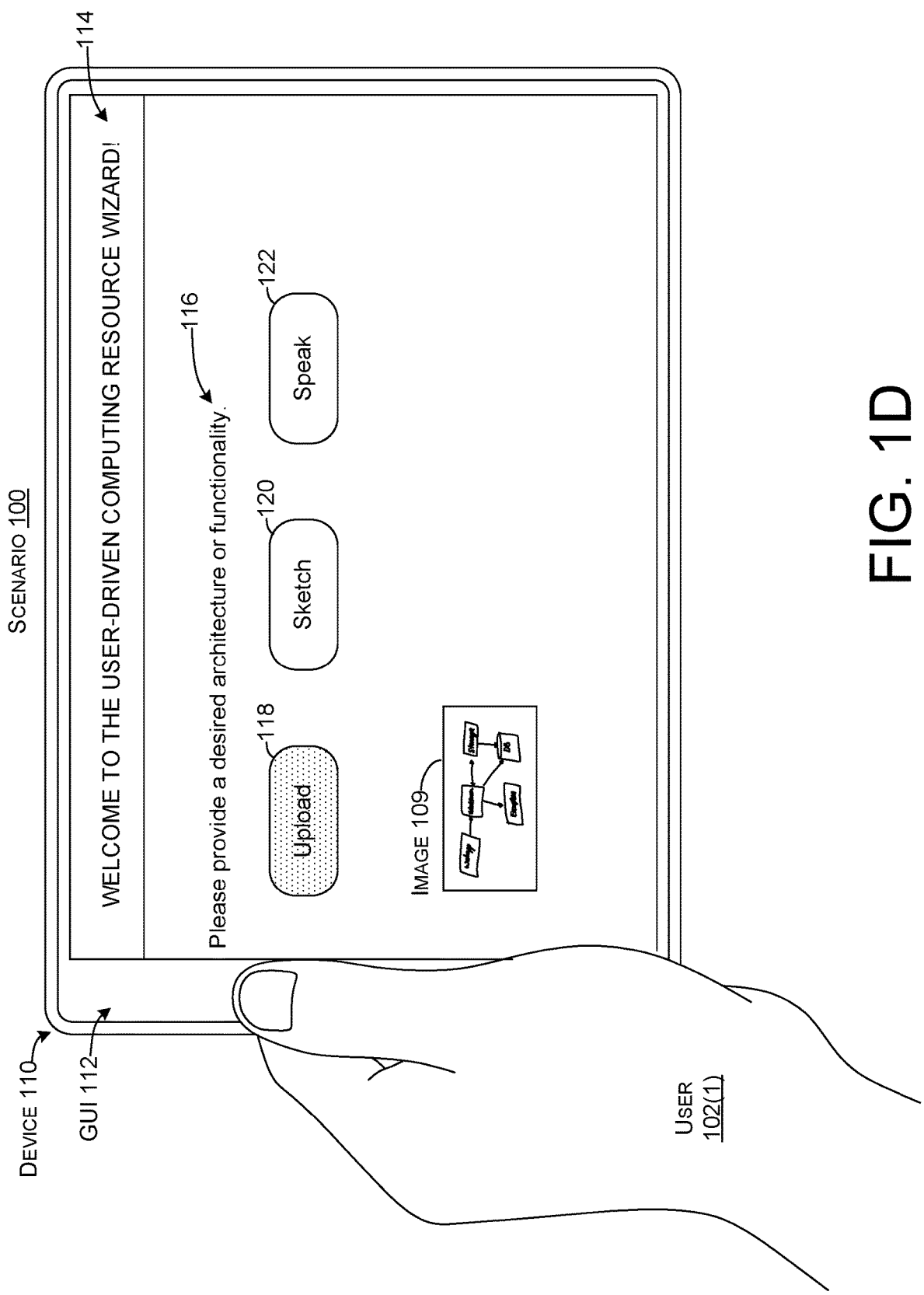

FIG. 1D shows the user utilizing the computing device 110 to access a graphical user interface (GUI) 112 of a user-driven computing resource wizard 114. The GUI 112 allows the user to request desired computing resources. Rather than forcing the user to input desired computing resources in a predefined manner, the GUI allows the user to input the desired computing resources in a free-form manner of the user's choice at 116. For instance, the free-form choices offered in this example include uploading the free-form input 118, sketching the free-form input 120, or speaking the free-form input 122. In this case, assume that the user has selected to upload the free-form input and has uploaded the image 109. The image can be used as free-form input to find corresponding remote computing resources for the user.

Figure 1E:
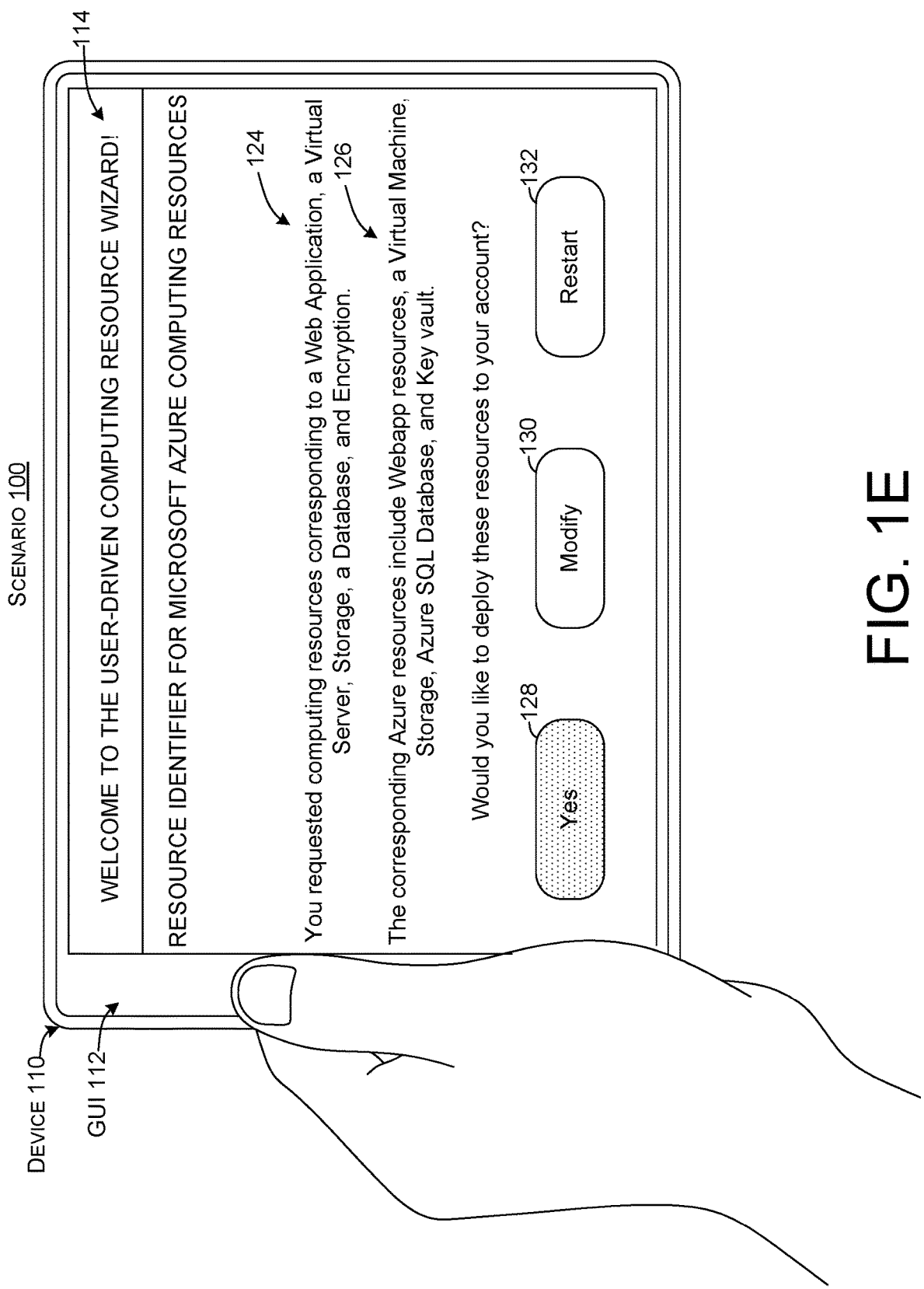

FIG. 1E shows the results obtained for the user's free-form input for desired computing resources. In this case, for ease of explanation the results relate to a single entity (e.g., Microsoft Azure®) that provides remote computing resources. (Other examples can relate to other entities. An additional example described below relative to FIGS. 2A-2D relates to results from multiple entities). In this case, the resource identifier shows that the user free-form input was interpreted to produce associated computing terms 124. Corresponding Azure resources identified from the associated computing terms are shown at 126 and include Webapp resources, Virtual Machine resources, Storage resources, Azure SQL® Database resources, and Key Vault resources. If these are the remote computing resources desired, the user can select to have the remote computing resources deployed at 128, otherwise, the user can modify the remote computing resources at 130 or restart the process at 132. Assume for purposes of explanation that the user is satisfied with the corresponding Azure remote computing resources and selects 'yes' at 128.

Figure 1F:
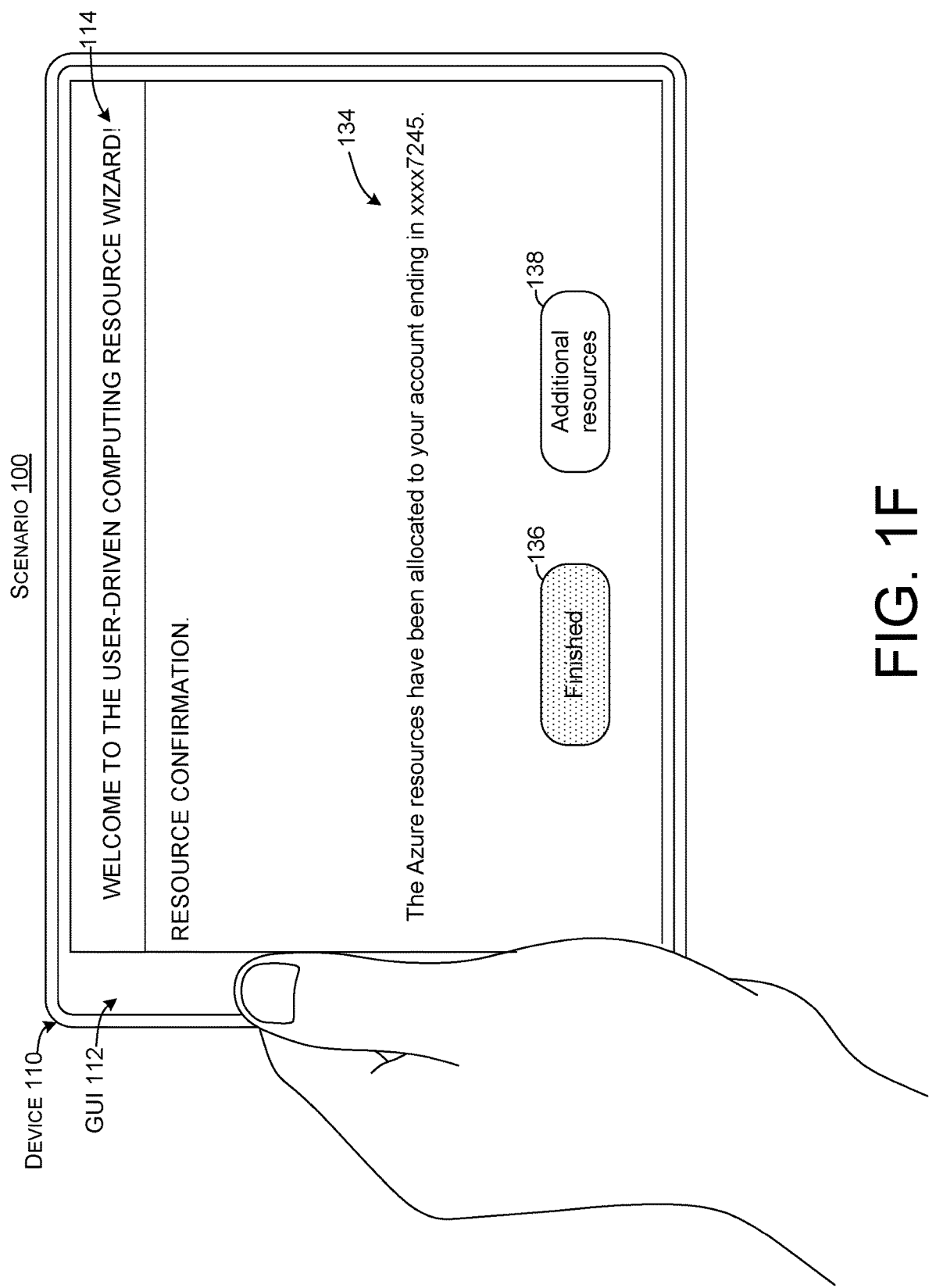

FIG. 1F shows a resource confirmation that the Azure remote computing resources were automatically allocated to the user at 134. In this case, the Azure remote computing resources were automatically allocated to the user's account ending in '7245' without any additional input from the user. If the user is done, he/she can select 'finished' at 136. Alternatively, if the user is interested in obtaining additional remote computing resources, the user can click 'additional resources' at 138.

FIGS. 2A-2D collectively show another example scenario 100A where a user experience can be enhanced by allowing the user to request computing resources in a manner in which they are comfortable. Many elements of FIGS. 2A-2D are similar to those of FIGS. 1A-1F and as such are not re-introduced for sake of brevity. Similar elements are distinguished by the addition of the suffix 'A.'

Figure 2A:
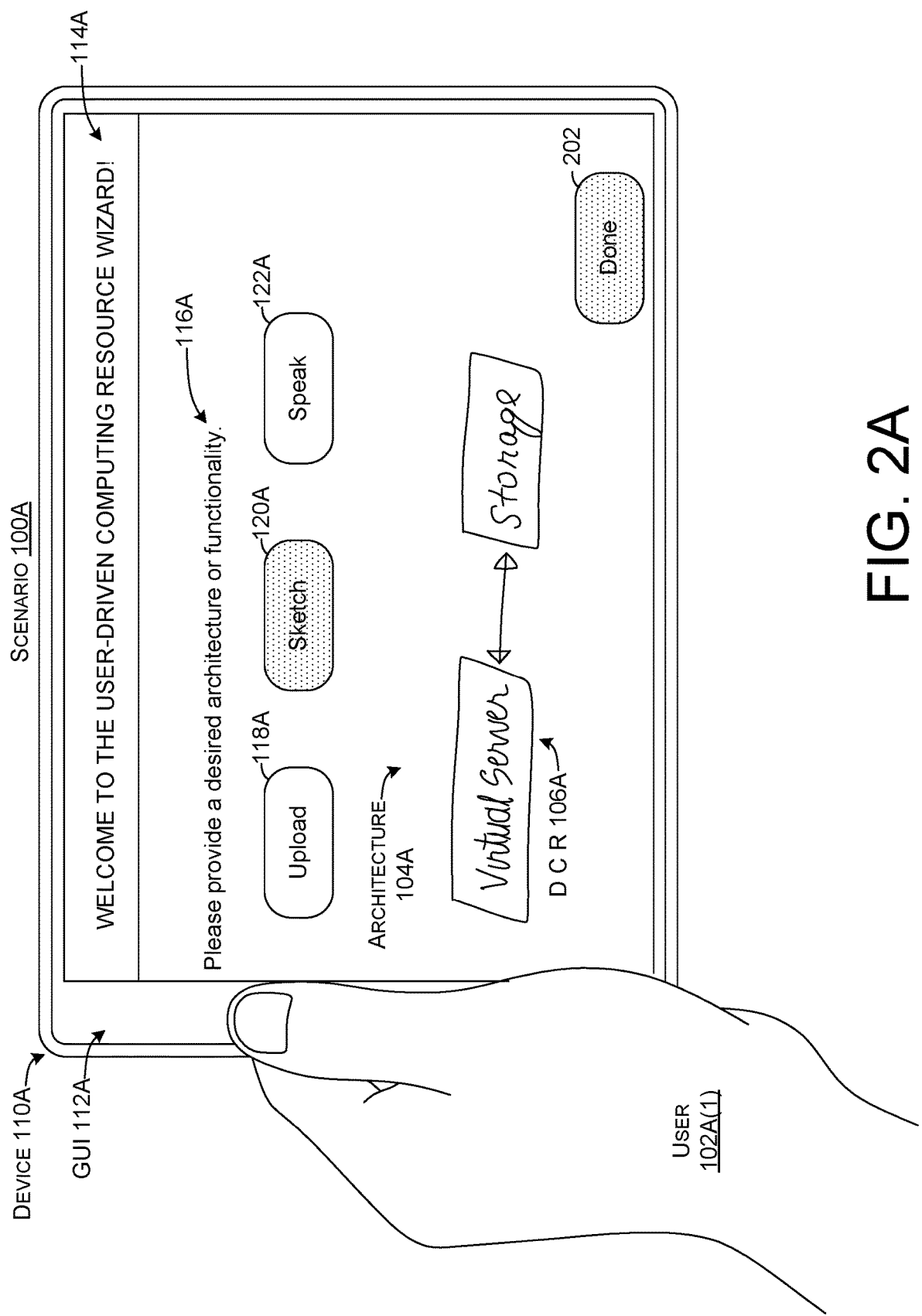

FIG. 2A shows that user 102A(1) has selected at 120A to sketch architecture 104A that includes desired computing resources 106A. The desired computing resources include a box that contains the term 'virtual server' and another box that contains the term 'storage.' The boxes are connected by a two-way arrow. Assume for purposes of explanation that the user has completed the sketch and selects done at 202.

Figure 2B:
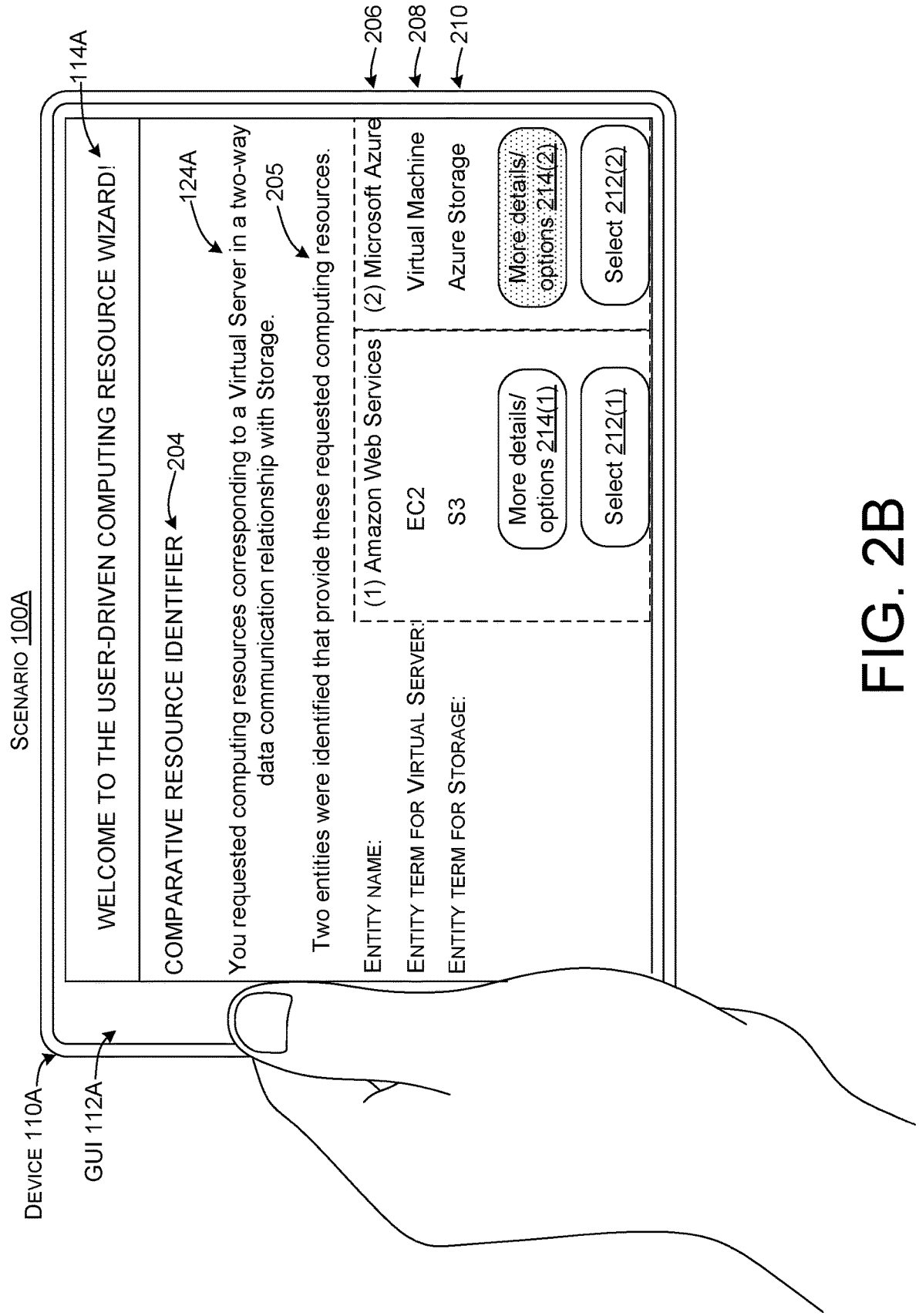

FIG. 2B shows a comparative resource identifier 204 on the GUI 112A. In this example, the comparative resource identifier shows how the user sketch was interpreted as associated computing terms 124A. The comparative resource identifier indicates that two entities were identified that provide the requested computing services at 205. Information is referenced horizontally, by entity name at 206, entity term for Virtual Server (e.g., first associated computing term) at 208, and entity term for storage (e.g., second associated computing term) at 210. In this example, the first entity name is 'Amazon Web Services' ™ and the second entity name is 'Microsoft Azure.' The Amazon Web Services term for virtual server is 'EC2' (elastic compute cloud). The Microsoft Azure term for virtual server is 'Virtual Machine.' The Amazon Web Services term for storage is 'S3' (simple storage services) and the Microsoft Azure term for storage is 'Azure Storage'. Thus, without knowing which entities can provide the desired remote computing resources or without knowing the lingo used by individual entities, the user can get a comparative listing of the entities and their remote computing resources. Only a limited amount of details can be shown on the example drawing page, but other implementations could provide different and/or additional details from the entities, third parties, user reviews, etc. (Note that several real-world examples of entities and remote computing resources are used in the discussion because these examples tend to be more readily understood by readers than hypothetical examples. The reader should understand that the present concepts can be applied to other entities and/or remote computing resources).

The user can select one of the listed entities to provide these remote computing resources at 212 or request more details/options at 214. Assume for purposes of explanation that the user selects more details/options relative to Microsoft Azure at 214(2).

Figure 2C:
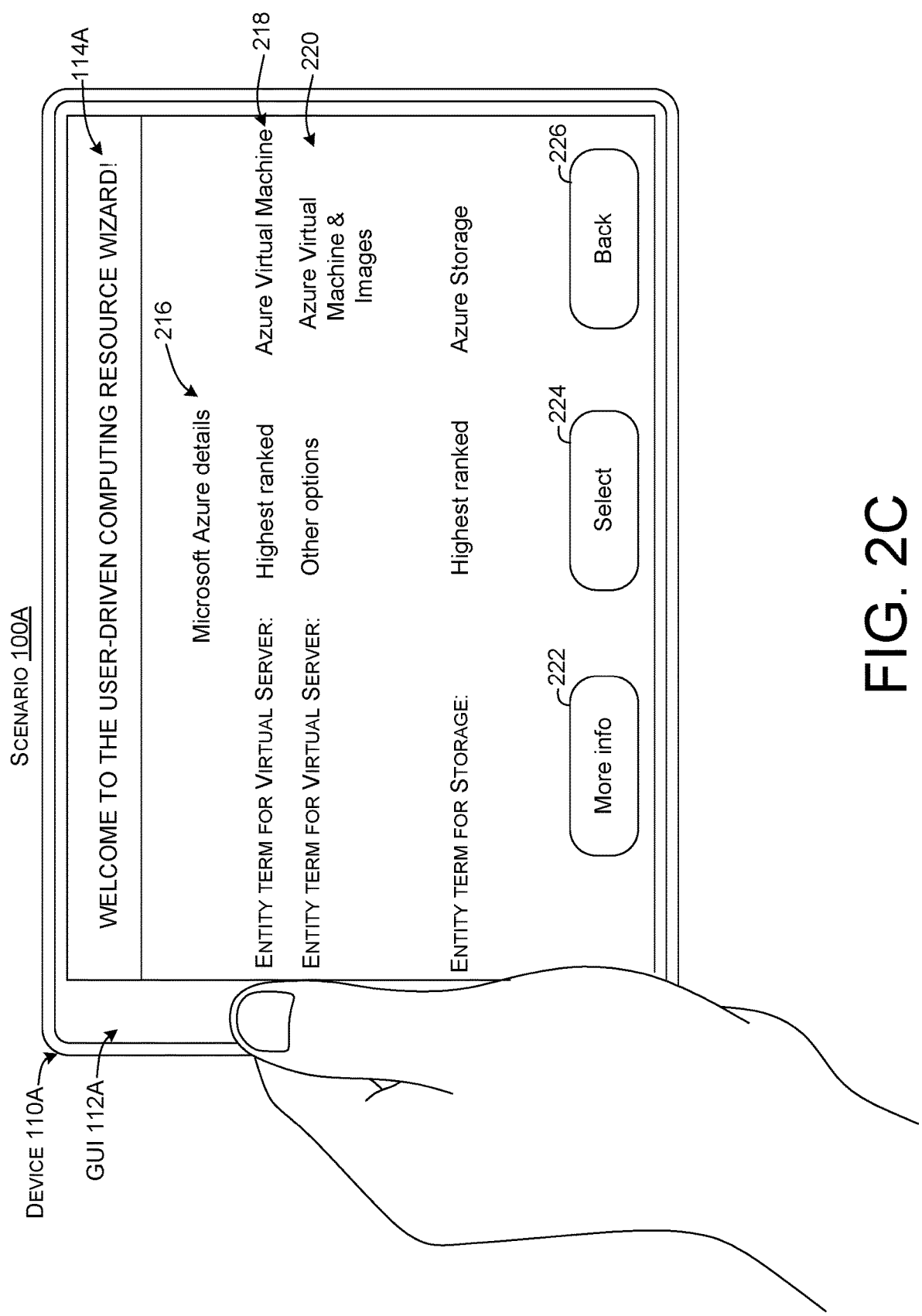

FIG. 2C shows GUI 112A with additional details about Microsoft Azure at 216 as requested by the user in FIG. 2B. In this case, the additional detail indicates at 218 that 'Azure Virtual Machine' was the highest ranked Microsoft Azure computing resource for the entity term 'virtual server'. At 220, the additional detail indicates that another Microsoft Azure computing resource was 'Azure Virtual Machine & Images.' The ranking could be performed based upon information from/about the user, such as previously selected computing resources and/or information from the architecture (e.g., some computing resources may work better together than others). Alternatively or additionally, the ranking could be performed based upon information from and/or relating to the entity, such as additional details, recommendations, customer reviews, etc. The user can specify individual options, such as by touching them on the GUI 112A and then selecting at 224. Alternatively, the user can request still more information at 222, or go back to the previous GUI at 226. Assume for purposes of explanation that the user specified 'Azure Virtual Machine' and 'Azure Storage' and 'Select' at 224.

Figure 2D:
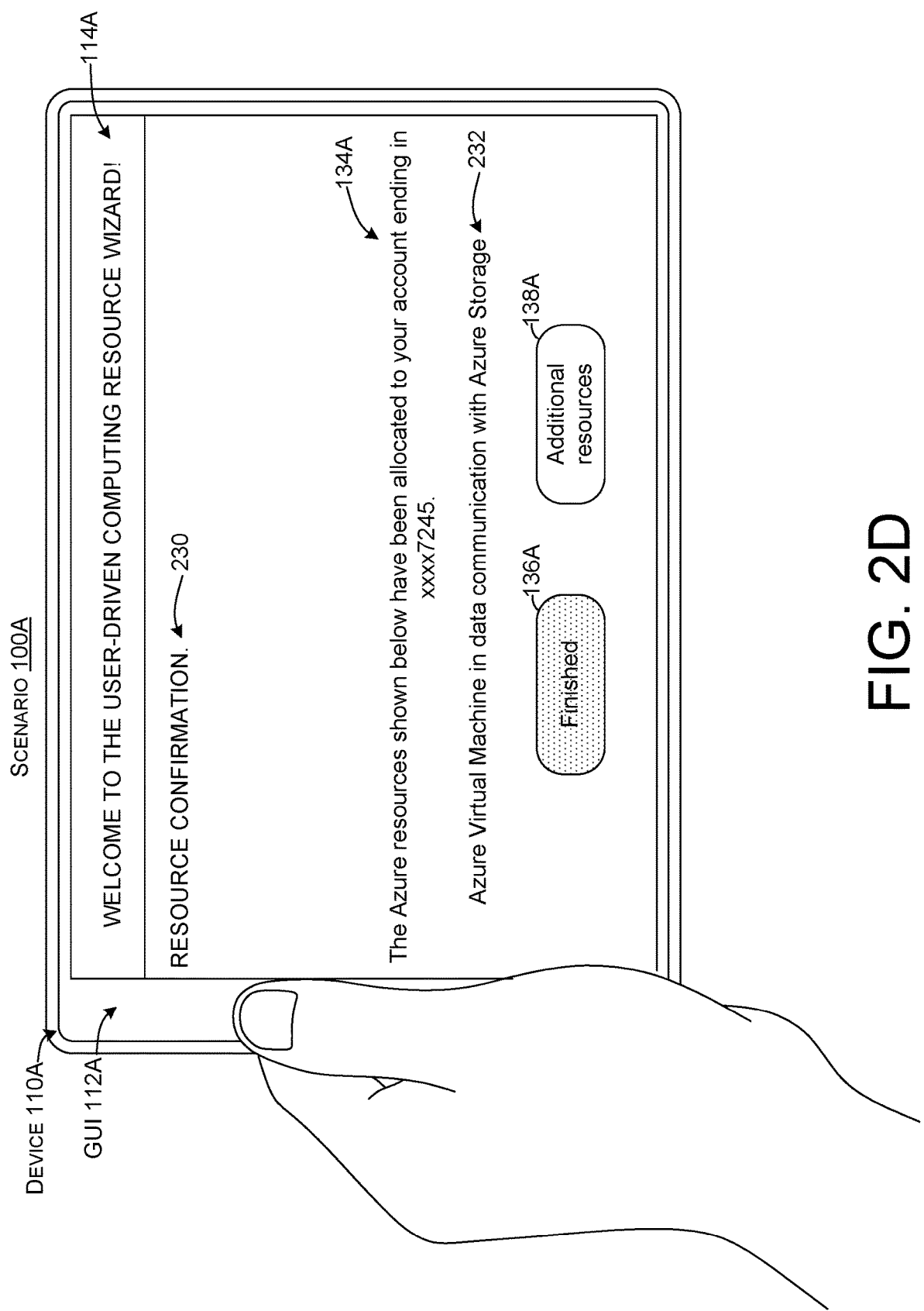

FIG. 2D shows a resource confirmation at 230 that shows at 232 that an Azure Virtual Machine in data connection with Azure storage has been allocated to the user account at 134A. The user can indicate that he/she is finished at 136A or desires additional resources at 138A. Assume for purposes of explanation, that the user indicates that he/she is finished at 136A.

The scenarios described above explain how a user can brainstorm and plan in the manner that is most efficient for them to determine a desired architecture and/or remote computing resources. The present concepts can interpret this input and can identify the remote computing resources from one or more supplying entities. The concepts can also automatically allocate these resources to the user without the user needing to know details about how to interact with the entity(s).

Figure 3:
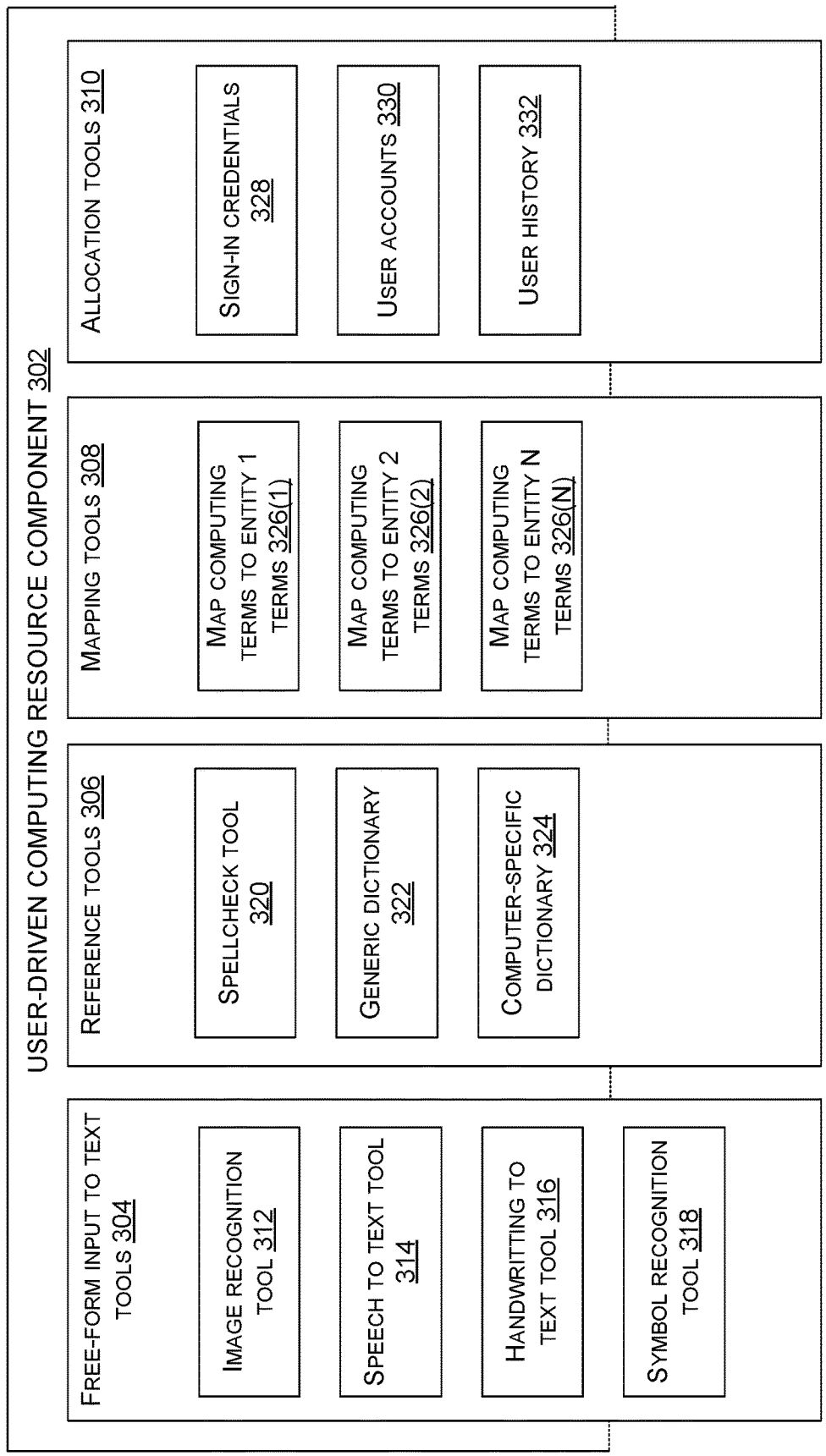
FIG. 3 shows an example user-driven computing resource component in accordance with some implementations of the present concepts.

FIG. 3 shows a user-driven computing resource component 302 that can generate the user-driven computing resource wizard (114 of FIGS. 1D-2D). The user-driven computing resource component 302 can include and/or access various tools to assist the user. In this case, the tools include free-form input to text tools 304, reference tools 306, mapping tools 308, and/or allocation tools 310. (This relationship is represented by the dashed line of the user-driven computing resource component which serves to indicate that the tools may be included in the user-driven computing resource component or may be external to, but in communication with the user-driven computing resource component).

In this case, the free-form input to text tools 304 can include image recognition tools 312, speech to text tools 314, handwriting recognition tools 316, and/or symbol recognition tools 318, among others. These tools can decipher any free-form input from the user, such as a written description, audible description, drawing, sketch, image, etc.

The reference tools 306 can include spellcheck tools 320, generic (e.g., subject neutral) dictionaries 322, and/or computer-specific dictionaries 324, among others.

The mapping tools 308 include computing terms to entity 1 terms maps 326(1), computing terms to entity 2 terms maps 326(2), and computing terms to entity N terms maps, among others. (The 'N' suffix is used to indicate that any number of maps can be utilized depending upon the number of entities offering remote computing resources). (Real life entity examples are used above relative to FIGS. 1A-2D. Here hypothetical entities '1,' '2,' . . . 'N' are used).

The allocation tools 310 can include sign-in credentials 328, user accounts 330, and/or user history 332, among others.

Generally, the user-driven computing resource component 302 can receive user free-form input relating to desired remote computing resources. The user does not have to conform to any predefined options. Instead the user can generate the free-form input in whatever form he/she desires. The free-from input to text tools can utilize the appropriate tools to interpret the user input. For instance, if the user provides the free-form input as an image, then the free-from input to text tools can leverage the image recognition tools 312. The image recognition tool can recognize aspects of the image and convert those aspects to text. The image recognition tool may operate in isolation or with other tools. For instance, relative to the example of FIGS. 1A-1D, the image recognition tool may recognize geometric shapes in the image and may leverage the handwriting to text tool 316 to interpret text in the geometric images. (Also note, that while the illustrated implementations are based upon the English language, other languages could be handled in the same or similar manner).

The image recognition tool 312 may leverage the symbol recognition tools 318 to interpret items, such as arrows that indicate relationships between aspects of the image. Eventually, the free-from input to text tools 304 can generate text that represents the free-form user input. This text can be analyzed by the reference tools 306. The spellcheck tools 320 can correct spelling errors generated originally by the user and/or by the text tools. Further, the text can be compared to generic dictionaries 322 and/or computer-specific dictionaries 324. For instance, the text could read 'date base' or 'datebase.' The spellcheck tools may not detect an error because 'date' and 'base' are both real and properly spelled words. Similarly, accessing the generic dictionary 322 could indicate that 'date' and 'base' are valid words. However, the computer-specific dictionary 324 could indicate that the words are more likely 'data base' of 'database.' In such a scenario, the results of the computer-specific dictionary 324 could be ranked higher or weighted and the text updated to 'database.' Thus, whether the error was a spelling error or a handwriting recognition induced error, the proper terms can be obtained via the reference tools 306.

Further, the user text may include abbreviations or company specific terminology that can be genericized to broader computer terms. For instance, the user may have sketched the letters 'VM.' The generic dictionary(s) 322 may produce multiple entries for this abbreviation, but the computer-specific dictionary 324 may indicate that 'VM' stands for 'virtual machine.' The computer-specific dictionary 324 may also indicate that 'virtual machine' may be more broadly recognized as 'virtual server.' Alternatively, the computer-specific dictionary may suggest virtual server as an alternate form so the term is treated as 'virtual machine/virtual server' Thus, the reference tools can serve to correct the free-form user input (and/or errors in interpreting the free-form user input) and can serve to broaden the user input to broadly recognized computer terms. The output of the reference tools 306 can be sent to the mapping tools 308.

The mapping tools 308 can receive the computing terms from the reference tools 306 and map the computing terms to individual entity terms. In some implementations, a map (e.g., data table) can exist for each entity that offers remote computing resources. Thus, comparing the computing terms to an individual map can identify whether the associated entity offers the corresponding remote computing resources and if so, what the entity calls the offering. Note that as mentioned above relative to FIG. 2C, the entity may have multiple competing offerings that map to a computing term. The map may also include other details about the entity's corresponding remote computing resources, such as how to obtain the computing resources (e.g., internal reference address).

The user-driven computing resource component 302 can present the mapped information to the user for evaluation. Example presentations are shown above relative to FIGS. 1E and 2B-2C. The user-driven computing resource component 302 can also utilize the allocation tools 310 during this process. For instance, the user-driven computing resource component 302 can utilize the user's sign-in credentials 328 and/or user accounts 330 when presenting information to the user on the GUI and/or when taking actions on the user's behalf, such as allocating remote computing resources from an entity. This can reduce the user having to manually enter his/her information as part of the process and instead leverages that this information (or most of it) is already known on the user login process.

For instance, consistent with the Microsoft-centric example describe above, the allocation tools 310 can use Microsoft Authentication service for users to login to access the user-driven computing resource wizard. The allocation tools can utilize the user's Microsoft ID to identify their Azure account(s) and subscriptions that are accessible to the user. Once the user knows what resources he/she want to create, the user can have the option to choose the subscription they would like to use for the allocation of these resources. The allocation tools 310 can then create new resources under the subscription chosen by the user. Alternatively, the user-driven computing resource wizard can also provide the user option to not create resources immediately but return at a later point and continue to deploy resources on their own, such as via an Azure Resource Management template. Such options can be provided relative to other entities, such as Amazon and Google, among others.

Also note, that information from the various tools can be made available to any other tools. For instance, the user history 332 can be utilized by other tools. For example, the user history (e.g., what remote computing resources the user has previously selected) may be considered when ranking offerings to the user. For example, in the illustrated implementation of FIG. 2C, the 'Azure Virtual Machine' offering is ranked higher than the similar 'Azure Virtual Machine & Images' offering. However, if the user has previously selected the latter offering in similar circumstances, the ranked order may be changed (e.g., 'Azure Virtual Machine & Images' offering ranked higher than the 'Azure Virtual Machine' offering). Similarly, user history could be used as a parameter in disambiguation performed by the referencing tools 306. For instance, the user may utilize an abbreviation in his/her free-form input that has multiple computer related definitions. The user history may provide an example of past usage of the abbreviation and subsequent user selections relating to one of the definitions. This previous usage can be utilized to determine which meaning the user likely intended in the present case.

The user-driven computing resource component 302 can allow the user to enter requests for remote computing resources in a manner convenient for the user (e.g., free-form input). The user-driven computing resource component 302 can leverage any or all of the tools 304 to 310 to identify corresponding offerings from one or more entities and obtain the selected offerings on the user's behalf without any additional time or effort on the user's part. Thus, when the user considers obtaining remote computing resources, the user-driven computing resource component 302 allows the user to operate in a way that is most efficient for the user. The user-driven computing resource component 302 can facilitate obtaining these remote computing resources on behalf of the user. Existing technology forces the user to operate in a paradigm dictated by the entities providing the remote computing resources. In contrast, the user-driven computing resource component 302 allows the user to define the paradigm and the user-driven computing resource component acts on the user's behalf with the providing entities.

Note also that while the above examples relate to visual implementations that can be illustrated in the patent drawings, similar implementations can be configured that emphasize other senses. For instance, the user could enter his/her free-from input as an audible (e.g., spoken) or Braille description and the system could respond in a similar manner and/or in a manner requested by the user.

Figure 4:
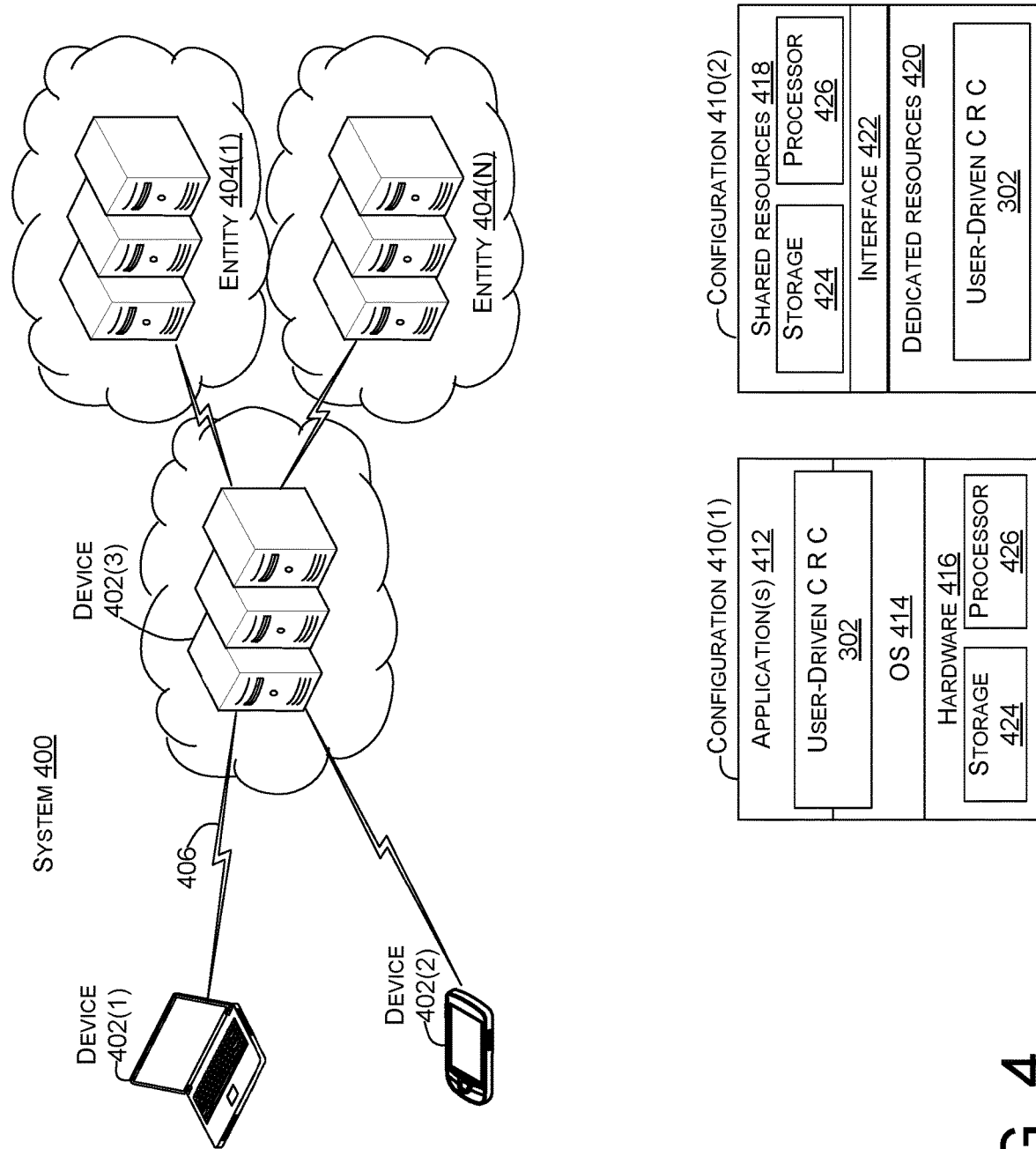
FIG. 4 shows an example free-form remote computing resource allocation system in accordance with some implementations of the present concepts.

FIG. 4 shows a system 400 that can accomplish securing remote computing resources based upon free-from user input. For purposes of explanation, system 400 can include one or more devices 402 that can be similar to device 110 of FIG. 1C. In the illustrated example, device 402(1) is manifest as a notebook computer device, example device 402(2) is manifest as a smart phone, and example device 402(3) is manifest as a server device. System 400 can also include, or relate to, one or more entities 404 that can provide remote computing resources. The devices 402 can communicate via one or more networks (represented by lightning bolts 406), can access the entities 404 over the networks, and/or can access the Internet over the networks.

FIG. 4 shows two device configurations 410 that can be employed by devices 402. Individual devices 402 can employ either of configurations 410(1) or 410(2), or an alternate configuration. (Due to space constraints on the drawing page, one instance of each configuration is illustrated rather than illustrating the device configurations relative to each device 402). Briefly, device configuration 410(1) represents an operating system (OS) centric configuration. Configuration 410(2) represents a system on a chip (SOC) configuration. Configuration 410(1) is organized into one or more applications 412, operating system 414, and hardware 416. Configuration 410(2) is organized into shared resources 418, dedicated resources 420, and an interface 422 there between.

In either configuration 410, the device can include storage/memory 424, a processor 426, and/or an instance of the user-driven computing resource component 302. The user-driven computing resource component 302 can be configured to receive free-form input from a user relating to remote computing resources and data-communication relationships between individual remote computing resources. The user-driven computing resource component can be configured to interpret the free-form input to identify associated computing terms and to map the computing terms to individual remote computing resources. The user-driven computing resource component can be configured to associate the data-communication relationships to the individual remote computing resources and present a preliminary selection of the mapped individual remote computing resources and the data-communication relationships. Responsive to a user affirmation, the user-driven computing resource component 302 can be configured to allocate the mapped individual remote computing resources with the data-communication relationships to an account associated with the user.

In some configurations, each of devices 402 can have an instance of the user-driven computing resource component 302. However, the functionalities that can be performed by user-driven computing resource component 302 may be the same or they may be different from one another. For instance, in some cases, each device's user-driven computing resource component 302 can be robust and provide all of the functionality described above and below (e.g., a device-centric implementation). In such a case, a single device can implement the present concepts. In other cases, some devices can employ a less robust instance of the user-driven computing resource component 302 that relies on some functionality to be performed remotely. For instance, device 402(3) may have more processing resources than device 402(1). As such, some of the functionality can be performed locally on device 402(1) and other functionality can be outsourced to device 402(3). Device 402(3) can return the results of its processing to device 402(1). Also, device 402(3) may be controlled by one of the entities or could be independent from the entities.

The term "device," "computer," or "computing device" as used herein can mean any type of device that has some amount of processing capability and/or storage capability.

Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 402 can include traditional computing devices, such as personal computers, desktop computers, servers, notebook computers, cell phones, smart phones, personal digital assistants, pad type computers, mobile computers, smart devices etc. and/or any of a myriad of ever-evolving or yet to be developed types of computing devices.

As mentioned above, configuration 410(2) can be thought of as a system on a chip (SOC) type design. In such a case, functionality provided by the device can be integrated on a single SOC or multiple coupled SOCs. One or more processors 426 can be configured to coordinate with shared resources 418, such as memory/storage 424, etc., and/or one or more dedicated resources 420, such as hardware blocks configured to perform certain specific functionality. Thus, the term "processor" as used herein can also refer to central processing units (CPUs), graphical processing units (GPUs), field programmable gate arrays (FPGAs), controllers, micro-controllers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 5:
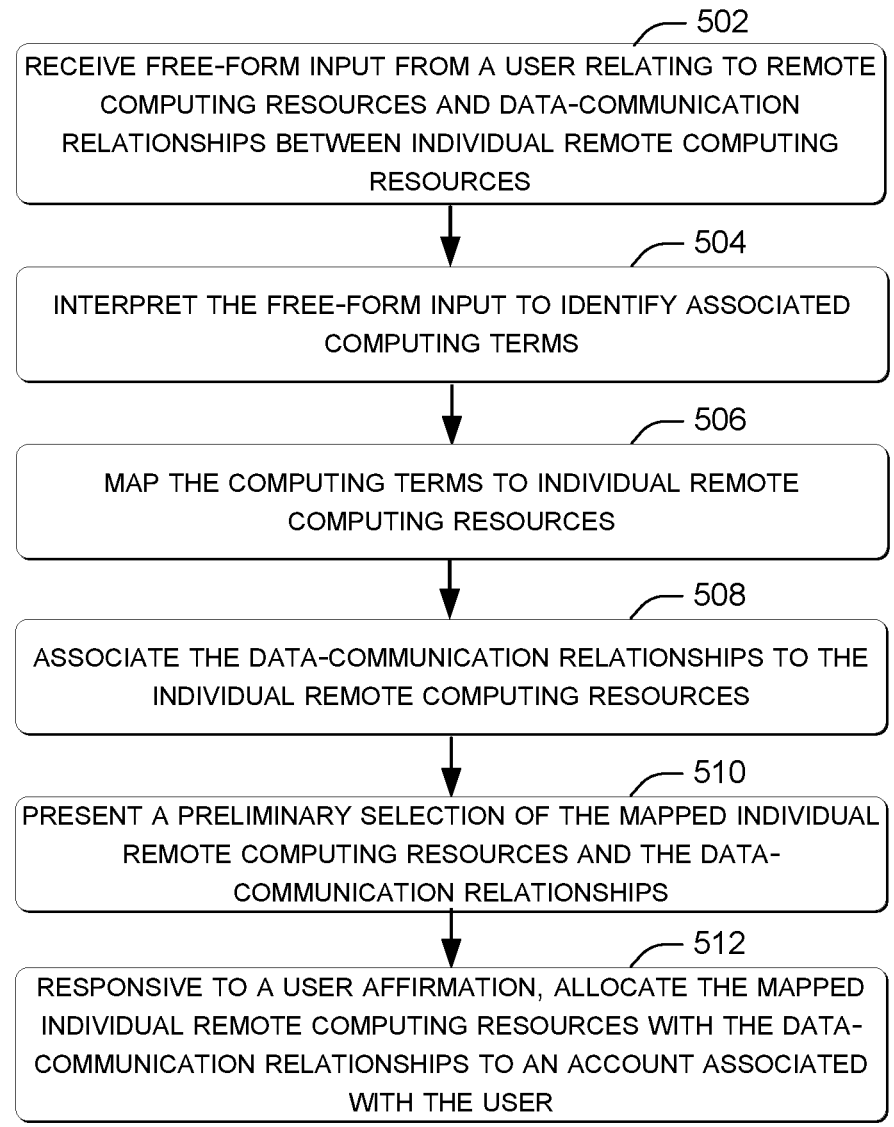
FIG. 5 shows a flowchart of example methods that can implement some of the present concepts in accordance with some implementations.

FIG. 5 shows a flowchart of a user-driven computing resource allocation technique or method 500.

The method can receive free-form input from a user relating to remote computing resources and data-communication relationships between individual remote computing resources at 502.

The method can interpret the free-form input to identify associated computing terms at 504.

The method can map the computing terms to individual remote computing resources at 506.

The method can associate the data-communication relationships to the individual remote computing resources at 508.

The method can present a preliminary selection of the mapped individual remote computing resources and the data-communication relationships at 510.

The method can, responsive to a user affirmation, allocate the mapped individual remote computing resources with the data-communication relationships to an account associated with the user at 512.

The described methods can be performed by the systems, devices, and/or elements described above and/or below, and/or by other devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Additional Examples

Various examples are described above. Additional examples are described below. One example includes a method comprising receiving free-form input from a user relating to remote computing resources and data-communication relationships between individual remote computing resources, interpreting the free-form input to identify associated computing terms, associating the data-communication relationships to the individual remote computing resources, presenting a preliminary selection of the mapped individual remote computing resources and the data-communication relationships, and responsive to a user affirmation, allocating the mapped individual remote computing resources with the data-communication relationships to an account associated with the user.

Another example can include any of the above and/or below examples where the receiving free-form input comprises receiving an image, a drawing, a written description, or an audible description.

Another example can include any of the above and/or below examples where the interpreting comprises converting the free-form input to text.

Another example can include any of the above and/or below examples where the interpreting comprises spell checking the text.

Another example can include any of the above and/or below examples where the spell checking comprises generic spell checking and computing term specific spell checking.

Another example can include any of the above and/or below examples where the interpreting comprises identifying relationships in the free-form input and conveying the relationships relative to the text.

Another example can include any of the above and/or below examples where the mapping the computing terms to individual remote computing resources comprises mapping to remote computing resources associated with a single entity or the mapping the computing terms to individual remote computing resources comprises mapping to remote computing resources associated with multiple entities.

Another example can include any of the above and/or below examples where the presenting comprises visually presenting.

Another example can include any of the above and/or below examples where the allocating the individual remote computing resources for the user comprises allocating the individual remote computing resources to an account associated with the user.

Another example includes a method comprising receiving free-form input from a user relating to remote computing resources, interpreting the free-form input to identify related computing terms, mapping the computing terms to individual remote computing resources, and allocating the individual remote computing resources for the user.

Another example can include any of the above and/or below examples where the receiving comprises receiving the free-form input on a graphical user interface.

Another example can include any of the above and/or below examples where the interpreting comprises converting the free-form input to text and comparing the text to a dictionary.

Another example can include any of the above and/or below examples where the comparing to a dictionary comprises comparing to a generic dictionary and a computer-specific dictionary.

Another example can include any of the above and/or below examples where the comparing comprises weighting results from the computer-specific dictionary higher than results from the generic dictionary.

Another example can include any of the above and/or below examples where the weighting further considers previous user history relating to the text.

Another example can include any of the above and/or below examples where the mapping the computing terms to individual remote computing resources comprises mapping to remote computing resources associated with competing entities that offer the individual remote computing resources.

Another example can include any of the above and/or below examples where the allocating comprises automatically allocating the individual remote computing resources to an account associated with the user.

Another example can include any of the above and/or below examples where the allocating is performed without additional user input or wherein the allocating is performed after user affirmation.

Another example includes a system comprising storage configured to store computer-readable instructions and a processor configured to implement the computer-readable instructions to receive free-form input from a user relating to remote computing resources, map the free-form input to individual remote computing resources, and allocate the individual remote computing resources for the user.

Another example can include any of the above and/or below examples where the system is implemented on a single device

CONCLUSION

Although the subject matter relating to user-driven computing resource allocation has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
  receiving a free-form input from a user, the free-form input including a drawing of an architecture showing desired remote computing resources and data-communication relationships between the desired remote computing resources;

identifying a first cloud services provider entity that provides first cloud resources that map to the desired remote computing resources;

identifying a second cloud services provider entity that provides second cloud resources that map to the desired remote computing resources;

presenting a listing of the first and second cloud services provider entities and the first and second cloud resources on a graphical user interface receiving a user selection on the graphical user interface of the first cloud services provider entity and the first cloud resources; and allocating the first cloud resources with the data-communication relationships between the first cloud resources to an account associated with the user.

2. The method of claim 1, further comprising interpreting the free-form input and converting the free-form input to text.

3. The method of claim 2, further comprising spell checking the text.

4. The method of claim 3, wherein the spell checking comprises generic spell checking and computing terminology specific spell checking.

5. The method of claim 2, wherein the interpreting comprises identifying the data-communication relationships in the free-form input and conveying the data-communication relationships relative to the text.

6. The method of claim 2, wherein the interpreting comprises identifying computing terminology within the free-form input.

7. The method of claim 1, wherein the drawing includes text representing the desired remote computing resources, the drawing includes connectors between the text representing the data-communication relationships between the desired remote computing resources, the connectors include a one-way arrow and a two-way arrow that represent one-way and two-way data-communication relationships between the desired remote computing resources, and the first cloud resources are allocated with the one-way and two-way data-communication relationships between the first cloud resources.

8. A method, comprising:

receiving a free-form input from a user, the free-form input including a drawing of an architecture showing desired remote computing resources;

identifying a first cloud services provider entity that provides first cloud resources that map to the desired remote computing resources;

identifying a second cloud services provider entity that provides second cloud resources that map to the desired remote computing resources;

presenting a listing of the first and second cloud services provider entities and the first and second cloud resources to the user;

receiving a user selection of the first cloud services provider entity; and allocating the first cloud resources for the user.

9. The method of claim 8, wherein the receiving comprises receiving the free-form input on a graphical user interface.

10. The method of claim 8, further comprising interpreting the free-form input, converting the free-form input to text, and comparing the text to a dictionary.

11. The method of claim 10, wherein the dictionary comprises a generic dictionary and a computer-specific dictionary.

12. The method of claim 11, wherein the comparing comprises weighting results from the computer-specific dictionary higher than results from the generic dictionary.

13. The method of claim 12, wherein the weighting further considers previous user history relating to the text.

14. The method of claim 10, wherein the interpreting comprises identifying computing terminology within the free-form input.

15. The method of claim 8, wherein the allocating comprises automatically allocating the first cloud resources to an account associated with the user.

16. The method of claim 8, wherein the allocating is performed without additional user input or wherein the allocating is performed after user affirmation.

17. The method of claim 8, wherein the drawing shows data-communication relationships among the desired remote computing resources.

18. The method of claim 17, wherein the drawing includes text representing the desired remote computing resources, the drawing includes connectors between the text representing the data-communication relationships between the desired remote computing resources, and the connectors include a one-way arrow and a two-way arrow that represent one-way and two-way data-communication relationships between the desired remote computing resources.

19. A system, comprising:

storage configured to store computer-readable instructions; and, a processor configured to implement the computer-readable instructions to:

receive free-form input from a user, the free-form input including a drawing of an architecture that specifies computing terminology relating to desired remote computing resources;

identify a first cloud services provider entity that provides first cloud resources that map to the desired remote computing resources;

identify a second cloud services provider entity that provides second cloud resources that map to the desired remote computing resources;

present a listing of the first and second cloud services provider entities and the first and second cloud resources to the user;

receive a user selection of the first cloud services provider entity; and allocate the first cloud resources for the user.

20. The system of claim 19, wherein the drawing specifies data-communication relationships among the computing terminology by including a one-way arrow and a two-way arrow that represent one-way and two-way data-communication relationships between the desired remote computing resources.

* * * * *